United States Patent
Schlemmer et al.

(10) Patent No.: US 10,415,425 B2
(45) Date of Patent: Sep. 17, 2019

(54) TURBOMACHINE STAGE

(71) Applicant: MTU Aero Engines AG, Munich (DE)

(72) Inventors: Markus Schlemmer, Mainburg/Sandelzhausen (DE); Andreas Hartung, Munich (DE); Karl-Hermann Richter, Markt Indersdorf (DE); Herbert Hanrieder, Hohenkammer (DE)

(73) Assignee: MTU Aero Engines AG, Munich (DE)

( * ) Notice: Subject to any disclaimer, the term of this patent is extended or adjusted under 35 U.S.C. 154(b) by 259 days.

(21) Appl. No.: 15/407,416

(22) Filed: Jan. 17, 2017

(65) Prior Publication Data

US 2017/0204740 A1 Jul. 20, 2017

(30) Foreign Application Priority Data

Jan. 19, 2016 (EP) ..................................... 16151966

(51) Int. Cl.
*F01D 25/06* (2006.01)
*F01D 5/12* (2006.01)
(Continued)

(52) U.S. Cl.
CPC .............. *F01D 25/06* (2013.01); *F01D 5/12* (2013.01); *F01D 5/16* (2013.01); *F01D 5/26* (2013.01);
(Continued)

(58) Field of Classification Search
CPC ..... F01D 5/12; F01D 5/16; F01D 5/26; F01D 5/30; F01D 5/34; F01D 9/04; F01D 9/041;
(Continued)

(56) References Cited

U.S. PATENT DOCUMENTS 1,833,754 A * 11/1931 Paget ........................ F01D 5/16 416/215

2,984,453 A * 5/1961 Heymann ................. F01D 5/16 416/229 A
(Continued)

FOREIGN PATENT DOCUMENTS

DE 102009010185 8/2010
EP 2 484 870 A1 8/2012
(Continued)

*Primary Examiner* — John Kwon
*Assistant Examiner* — Johnny H Hoang
(74) *Attorney, Agent, or Firm* — Davidson, Davidson & Kappel, LLC

(57) ABSTRACT

The invention relates to a turbomachine including:
a guide baffle, whose $s_v$ guide blades are situated on c guide blade carriers; and
an adjacent moving baffle including $s_b$ moving blades;
the guide baffle $n_v$ including impulse bodies which are situated in a cavity system of the guide baffle with movement play with respect to the impulse contact; the moving baffle $n_b$ including impulse bodies which are situated in a cavity system of the moving baffle with movement play with respect to the impulse contact; and quotient $$\frac{\sum_{i=1}^{n_v} m_i}{s_v - c}$$

of sum $$\sum_{i=1}^{n_v} m_i$$

of the masses of all impulse bodies of the guide baffle divided by the difference ($s_v$–c) of the number $s_v$ of all guide blades minus the number c of all guide blade carriers amounts to at least 1.5 times quotient
(Continued)

of sum $$\frac{\sum_{j=1}^{n_b} m_j}{s_b}$$

of the masses of all impulse bodies of the moving baffle divided by the number $s_b$ of all moving blades $$\left( \frac{\sum_{i=1}^{n_v} m_i}{s_v - c} \geq 1.5 \cdot \frac{\sum_{j=1}^{n_b} m_j}{s_b} \right).$$

26 Claims, 1 Drawing Sheet

(51) Int. Cl.
  *F01D 5/30*   (2006.01)
  *F01D 5/34*   (2006.01)
  *F01D 5/16*   (2006.01)
  *F01D 5/26*   (2006.01)
  *F01D 25/26*   (2006.01)
  *F01D 9/04*   (2006.01)

(52) U.S. Cl.
  CPC ............... *F01D 5/30* (2013.01); *F01D 5/34* (2013.01); *F01D 25/26* (2013.01); *F01D 9/041* (2013.01); *F05D 2220/323* (2013.01); *F05D 2250/241* (2013.01); *F05D 2260/96* (2013.01); *Y02T 50/671* (2013.01)

(58) Field of Classification Search
  CPC .......... F01D 9/042; F01D 25/06; F01D 25/26; F04D 29/32; F04D 29/324; F04D 29/661; F04D 29/668; F05D 2220/32; F05D 2220/323; F05D 2240/129; F05D 2240/30; F05D 2250/241; F05D 2260/96; F05D 2260/964

USPC .................. 415/119; 416/145, 248, 500
See application file for complete search history.

(56) References Cited

U.S. PATENT DOCUMENTS

| | | | | |
|---|---|---|---|---|
| 2,999,669 | A * | 9/1961 | McGinnis | F01D 5/16 |
| | | | | 416/229 A |
| 3,609,841 | A * | 10/1971 | Telfer et al. | F01D 5/3061 |
| | | | | 219/121.14 |
| 3,868,196 | A * | 2/1975 | Lown | F04D 27/0215 |
| | | | | 415/143 |
| 4,568,247 | A * | 2/1986 | Jones | F01D 5/22 |
| | | | | 416/145 |
| RE32,339 | E * | 1/1987 | Jones | F01D 5/30 |
| | | | | 416/190 |
| 6,183,192 | B1 * | 2/2001 | Tressler | F01D 5/189 |
| | | | | 415/115 |
| 9,151,170 | B2 * | 10/2015 | El-Aini | F01D 5/10 |
| 9,371,733 | B2 | 6/2016 | Hartung | |
| 2005/0254940 | A1 * | 11/2005 | Care | F01D 5/26 |
| | | | | 415/170.1 |
| 2009/0191053 | A1 * | 7/2009 | Bridge | F01D 5/225 |
| | | | | 415/208.2 |
| 2012/0224953 | A1 * | 9/2012 | Cortequisse | F01D 11/122 |
| | | | | 415/200 |
| 2013/0280083 | A1 | 10/2013 | Hartung et al. | |
| 2014/0072407 | A1 * | 3/2014 | Harron | F01D 5/16 |
| | | | | 415/119 |
| 2014/0154059 | A1 * | 6/2014 | Jewess | F01D 25/12 |
| | | | | 415/170.1 |
| 2014/0348639 | A1 * | 11/2014 | Stiehler | F01D 5/18 |
| | | | | 415/119 |
| 2014/0348657 | A1 | 11/2014 | Stiehler et al. | |
| 2015/0167479 | A1 | 6/2015 | Hartung | |
| 2016/0010462 | A1 | 1/2016 | Stiehler | |
| 2016/0024945 | A1 * | 1/2016 | Stiehler | F01D 5/30 |
| | | | | 415/208.1 |
| 2016/0146041 | A1 | 5/2016 | Hartung et al. | |
| 2016/0172955 | A1 * | 6/2016 | Sirous | F01D 1/32 |
| | | | | 310/11 |
| 2017/0044910 | A1 * | 2/2017 | Hartung | F01D 5/16 |

FOREIGN PATENT DOCUMENTS

| | | |
|---|---|---|
| EP | 2 806 106 A1 | 11/2014 |
| EP | 2806105 | 11/2014 |
| EP | 3023584 | 5/2016 |
| WO | WO 2012/095067 A1 | 7/2012 |

* cited by examiner

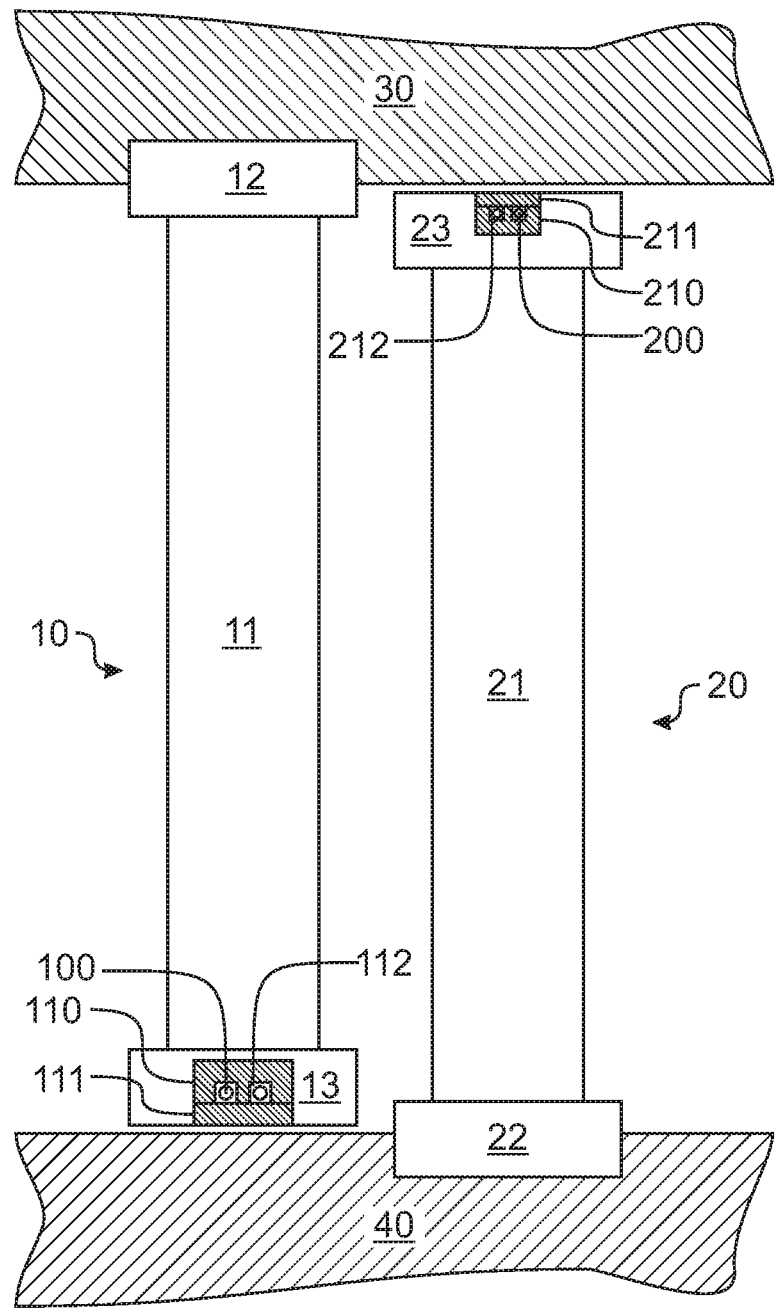

TURBOMACHINE STAGE

This claims the benefit of European Patent Application EP 16151966.5, filed Jan. 19, 2016 and hereby incorporated by reference herein.

The studies which have led to this invention were supported by the Grant Agreement No. CSJU-GAM-SAGE-2008-001 as part of the Seventh Framework Program of the European Union (FP7/2007-2013) for the Clean Sky Joint Technology Initiative.

The present invention relates to a turbomachine stage including a guide baffle and an adjacent moving baffle, a turbomachine, in particular a gas turbine, including the turbomachine stage, and to a method for configuring and/or manufacturing the turbomachine stage.

BACKGROUND

WO 2012/095067 A1, which belongs to the applicant, describes situating impulse bodies on guide blades and moving blades of a gas turbine for impulse contact with the blades.

SUMMARY OF THE INVENTION

A new concept for reducing undesirable vibrations, which was developed by the applicant and which is essentially based not on friction dissipation, but rather on detuning inherent shapes and natural frequencies via impulses of the impulse bodies, may therefore be implemented. For further details on this concept for detuning, reference to WO 2012/095067 A1 and its contents is additionally and expressly incorporated by reference into the present disclosure.

It is an object of the present invention improve the operating behavior, in particular the vibration behavior, of a turbomachine, in particular of a gas turbine.

The present invention provides one or multiple turbomachine stage(s) and a method. A turbomachine is also provided, in particular a gas turbine, in particular an aircraft engine gas turbine, including one or several of the turbomachine stage(s) described herein.

According to one embodiment of the present invention, one or multiple axially (relative to a (main) machine axis) interspaced turbomachine stage(s) for a, in particular one, turbomachine, in particular a gas turbine, in particular an aircraft engine gas turbine, (each) includes or include in particular exactly one or only one guide baffle and, in particular, exactly one or only one in particular axially (relative to one or the (main) machine axis) adjacent moving baffle.

In one embodiment, the guide baffle of the turbomachine stage or of one or several of the turbomachine stages for the or of the turbomachine is stationary (in each case) relative to a housing of the turbomachine and includes (in each case) a number of guide blades, in particular guide vanes or profiles, which are situated next to one another, in particular in the circumferential direction (relative to one or the (main) machine axis), for flow deflection and/or for converting kinetic energy into pressure energy. In one embodiment, the guide blades of the turbomachine stage or of one or several of the turbomachine stages for the or of the turbomachine are fixed with respect to the housing or are stationary with respect to the housing, but are adjustable, in particular, in terms of their position or orientation.

The total number or the number of all guide blades—which are situated next to one another, in particular in the circumferential direction (relative to a or the (main) machine axis)—of one turbomachine stage is designated herein (in each case) as $s_v$, different turbomachine stages u=1, 2 . . . having different total numbers or numbers $s_{v(,u)}$ of guide blades in one embodiment. In one embodiment, the total number or the number $s_{v(,u)}$ of all guide blades of the turbomachine stage or of one or several of the turbomachine stages for the or of the turbomachine is at least 50, in particular at least 100, in particular at least 200 (in each case or within the particular turbomachine stage).

In one embodiment, the guide blades of the guide baffle of the turbomachine stage or of one or several of the turbomachine stages for the or of the turbomachine are situated (in each case) on a total of c guide blade carriers of this guide baffle, c designating (in each case) the total number or the number of all guide blade carriers of the (corresponding) turbomachine stage and, in one embodiment, different turbomachine stages or guide baffles u=1, 2 . . . have different total numbers or numbers $c_{(,u)}$ of guide blade carriers.

In one embodiment, situated on one or multiple, in particular all c, guide blade carrier(s) of the turbomachine stage or of one or several of the turbomachine stages for the or of the turbomachine are (in each case) at least two, in particular at least three, in particular at least four and, in particular, at least five of total number $s_v$ of guide blades of the (particular) guide baffle, in particular being nondestructively removably or non-nondestructively removably attached to the particular guide blade carrier or being designed integrally with the particular guide blade carrier. Therefore, in one embodiment, the following applies (in each case) for the guide baffle of the turbomachine stage or of one or several of the turbomachine stages for the or of the turbomachine: $s_v > c$, in particular $s_v \geq 2 \cdot c$, in particular $s_v \geq 3 \cdot c$, in particular $s_v \geq 4 \cdot c$ and, in particular, $s_v \geq 5 \cdot c$.

In one embodiment, the guide blades, in particular guide vanes or profiles, which are situated on a (shared) guide blade carrier, in particular being non-nondestructively removably connected thereto or being manufactured integrally therewith, form, together with the guide blade carrier (in each case), in particular, a so-called guide blade cluster or a guide blade assembly or group. Additionally or alternatively, the guide blade carrier (in each case) may include or form a radially inner shroud and/or a radially outer shroud, in particular for the radial delimitation of a flow channel, or may include or form a part thereof.

In one embodiment, the moving baffle of the turbomachine stage or of one or several of the turbomachine stages for the or of the turbomachine is stationary (in each case) relative to a rotor of the turbomachine, which is in particular rotatably situated in the housing of the turbomachine, and (in each case) includes a number of moving blades which are situated next to one another, in particular in the circumferential direction (relative to a or the (main) machine axis), for flow deflection and/or for transferring kinetic energy into or out of the flow.

In one embodiment, the moving blades of the turbomachine stage or of one or several of the turbomachine stages for the or of the turbomachine are (each) nondestructively removably or non-nondestructively removably attached to the single- or multiple-part rotor, in particular a rotor disk, or is designed integrally with a rotor disk, in particular in the form of a so-called blisk. Therefore, in one embodiment, moving blades, individually or in groups in each case, or all moving blades of a or the moving baffle may have each been manufactured or may each be manufactured integrally with one another.

The total number or the number of all moving blades—which are situated next to one another, in particular in the circumferential direction (relative to one or the (main) machine axis)—of one turbomachine stage is designated (in each case) as $s_b$, different turbomachine stages u=1, 2 . . . having different total numbers or numbers $s_{b(,u)}$ of moving blades in one embodiment. In one embodiment, total number or number $s_{b(,u)}$ of all moving blades of the turbomachine stage or of one or several of the turbomachine stages for the or of the turbomachine is at least 50, in particular at least 100, in particular at least 200, and/or most $0.75 \cdot s_{v(,u)}$, in particular at most $0.5 \cdot s_{v(,u)}$ (in each case or within the particular turbomachine stage).

According to one embodiment of the present invention, the guide baffle of the turbomachine stage or of one or several of the turbomachine stages for the or of the turbomachine includes (in each case) impulse bodies which are situated in a cavity system of the (particular) guide baffle, in particular a cavity system in the (particular) guide baffle, with movement play with respect to the impulse contact.

The total number or the number of all impulse bodies (situated on the guide baffle or in its cavity system) of the guide baffle of a turbomachine stage is designated (in each case) as $n_v$, the guide baffle of different turbomachine stages u=1, 2 . . . having different total numbers or numbers of impulse bodies $n_{v(,u)}$ in one embodiment.

According to one embodiment of the present invention, the moving baffle of the turbomachine stage or of one or several of the turbomachine stages for the or of the turbomachine includes (in each case) impulse bodies which are situated in a cavity system of the (particular) moving baffle, in particular a cavity system in the (particular) moving baffle, with movement play with respect to the impulse contact.

The total number or the number of all impulse bodies (situated on the moving baffle or in its cavity system) of the moving baffle of a turbomachine stage is designated (in each case) as $n_b$, the moving baffle of different turbomachine stages u=1, 2 . . . having different total numbers or numbers of impulse bodies $n_{b(,u)}$ in one embodiment.

In one embodiment, the impulse bodies are provided for impulse contact or, during operation, carry out impulse contacts with the cavity systems or their walls or are designed for this purpose or in this way. In the present case, an impulse contact is understood to mean, in particular, in a conventional sense, a brief or impulse-like, in particular at least essentially completely elastic, and/or stochastic or random contact. Reference is also made to WO 2012/095067 A1 in this regard.

According to one embodiment of the present invention, the turbomachine stage or one or several of the turbomachine stages for the or of the turbomachine is or are designed, in particular configured or manufactured, in such a way (in each case), in particular guide baffles and moving baffles being equipped with impulse bodies in such a way, that, for the turbomachine stage (in each case or within the particular turbomachine stage), quotient $$\frac{\sum_{i=1}^{n_v} m_i}{s_v - c}$$

of sum $$\sum_{i=1}^{n_v} m_i$$

of the masses of all impulse bodies (situated on the guide baffle or in its cavity system) of the guide baffle of the turbomachine stage divided by difference ($s_v$–c) of number $s_v$ of all guide blades of the turbomachine stage minus number c of all guide blade carriers of the turbomachine stage amounts to at least 1.5 times, in particular at least 1.8 times and, in particular, at least 2 times or twice quotient $$\frac{\sum_{j=1}^{n_b} m_j}{s_b}$$

of sum $$\sum_{j=1}^{n_b} m_j$$

of the masses of all impulse bodies (situated on the moving baffle or in its cavity system) of the moving baffle of the turbomachine stage divided by number $s_b$ of all moving blades of the turbomachine stage.

In other words, the turbomachine stage or one or several of the turbomachine stages for the or of the turbomachine is or are configured or designed or manufactured in such a way (in each case), in particular guide baffles and moving baffles being equipped with impulse bodies in such a way, that the following applies for the turbomachine stage (in each case):

$$\frac{\sum_{i=1}^{n_v} m_i}{s_v - c} \geq 1.5 \cdot \frac{\sum_{j=1}^{n_b} m_j}{s_b},$$

in particular $$\frac{\sum_{i=1}^{n_v} m_i}{s_v - c} \geq 1.8 \cdot \frac{\sum_{j=1}^{n_b} m_j}{s_b},$$

in particular $$\frac{\sum_{i=1}^{n_v} m_i}{s_v - c} \geq 2 \cdot \frac{\sum_{j=1}^{n_b} m_j}{s_b}$$

with masses $m_i$ of total number $n_v$ of impulse bodies of the (particular) guide baffle and masses $m_j$ of total number $n_b$ of impulse bodies of the (particular) moving baffle and $s_v > c$.

It has been proven, surprisingly, that such a lower limit for the, therefore, overall greater relative or specific or average impulse body mass of the guide baffle effectuates a particularly advantageous detuning of the (particular) turbomachine stage. It is suspected that this is due at least partially to the absence of a centrifugal force effect in the guide baffle and to its regularly greater total mass, in particular blade mass.

In one embodiment, the moving baffle is situated upstream from the adjacent guide baffle and, therefore, the guide baffle may be, in particular, a so-called subsequent guide baffle of the moving baffle of the turbomachine stage. In yet another embodiment, the moving baffle is situated downstream from the adjacent guide baffle and, therefore, the guide baffle may be, in particular, a so-called initial guide baffle of the moving baffle of the turbomachine stage. In one embodiment, the turbomachine stage or one or several of the turbomachine stages for the or of the turbomachine is or are (in each case) a compressor stage or a turbine stage.

It has been proven, surprisingly, that a particularly advantageous reduction of blade and/or structural vibrations may be effectuated in such an application.

In one embodiment, one or several of the impulse bodies is or are spherical and/or are made of metal or of $CrO_2$. As a result, an advantageous impulse contact may be implemented.

In one embodiment, exactly one impulse body is situated in one cavity or multiple cavities of the cavity system (in each case). Advantageous individual impulse contacts may be implemented as a result. Purely theoretically, it is also feasible, additionally or alternatively, in one embodiment, to situate two or more impulse bodies in one cavity or multiple cavities of the cavity system (in each case). As a result, impulse contacts between impulse bodies may also be implemented.

In one embodiment, one or several of the impulse bodies (in each case) is/are situated non-captively or freely movably in a cavity of the cavity systems, which is or may be air-filled in one refinement. As a result, an advantageous impulse contact may be implemented.

In one embodiment, one or multiple cavities of the cavity systems (in each case) is or are situated in one or multiple separately manufactured housing(s).

In one refinement, one or multiple housing(s) may include (in each case) one cavity or multiple cavities, which is or are at least partially equipped with impulse bodies, and/or may be nondestructively removably or non-nondestructively removably attached to a guide blade or a moving blade or to a guide blade carrier. In one refinement, one or multiple housing(s) may be situated (in each case), in particular on, in particular in a radially inner or radially outer shroud of the guide baffle or moving baffle, in particular on a side thereof facing away from the vane. Additionally or alternatively, in one refinement, one cavity or multiple cavities—which is or are at least partially equipped with impulse bodies—of one or multiple of the housing(s) may be or are (in each case) airtight (closed), in particular with the aid of a, in particular shared, cover.

In one embodiment, exactly one housing is situated on one or multiple guide vane(s) and/or on one or multiple guide blade carrier(s) of the guide baffle of the turbomachine stage or of one or several turbomachine stages for the or of the turbomachine (in each case) and/or two or more housings are situated on one or multiple guide vane(s) and/or on one or multiple guide blade carrier(s) of the guide baffle of the turbomachine stage or of one or several turbomachine stages for the or of the turbomachine (in each case) and/or no such housing is situated on one or multiple guide vane(s) and/or on one or multiple guide blade carrier(s) of the guide baffle of the turbomachine stage or of one or several of the turbomachine stages for the or of the turbomachine (in each case). Additionally or alternatively, in one embodiment, exactly one housing is situated on one or multiple moving blade(s) of the moving baffle of the turbomachine stage or of one or several of the turbomachine stages for the or of the turbomachine (in each case) and/or two or more housings are situated on one or multiple moving blade(s) of the moving baffle of the turbomachine stage or of one or several of the turbomachine stages for the or of the turbomachine (in each case) and/or no such housing is situated on one or multiple moving blade(s) of the moving baffle of the turbomachine stage or of one or several of the turbomachine stages for the or of the turbomachine (in each case). As a result, in one embodiment, a guide baffle may be advantageously equipped with the impulse bodies.

In one preferred embodiment, one or several of the impulse bodies (in each case) of the guide baffle or cavities of the cavity system of the guide baffle equipped therewith is or are situated on, in particular in, a radially inner shroud of the guide baffle, in particular a radially inner shroud (part) of one or several of its guide blade carriers, or one radially inner shroud (part) of one or several guide blade carrier(s) includes or include (in each case) one or several of the impulse bodies of the guide baffle or cavities of the cavity system of the guide baffle equipped therewith. Additionally or alternatively, in one embodiment, one or several of the impulse bodies (in each case) of the guide baffle or cavities of the cavity system of the guide baffle equipped therewith is or are situated on, in particular in, a radially outer shroud of the guide baffle, in particular a radially outer shroud (part) of one or several of its guide blade carrier(s), or one radially outer shroud (part) of one or several guide blade carrier(s) includes or include (in each case) one or several of the impulse bodies of the guide baffle or cavities of the cavity system of the guide baffle equipped therewith. Additionally or alternatively, in one embodiment, one or several of the impulse bodies (in each case) of the guide baffle or cavities of the cavity system of the guide baffle equipped therewith is or are situated on, in particular in, one or several guide vane(s) of the guide baffle, or one or several guide blade(s) of one or multiple guide blade carrier(s) includes or include (in each case) one or several of the impulse bodies of the guide baffle or cavities of the cavity system of the guide baffle equipped therewith.

Additionally or alternatively, in one embodiment, one of the impulse bodies or several impulse bodies (in each case) of the moving baffle or cavities of the cavity system of the moving baffle equipped therewith is or are situated on, in particular in, one or multiple moving blade(s) of the guide baffle, or one or multiple moving blade(s) includes or include (in each case) one or several of the impulse bodies of the moving baffle or cavities of the cavity system of the moving baffle equipped therewith. In particular, in one embodiment, one or several of the impulse bodies of the moving baffle or cavities of the cavity system of the moving baffle equipped therewith is or are situated on, in particular in, a radially inner shroud of the moving baffle. Additionally or alternatively, in one embodiment, one or several of the impulse bodies of the moving baffle or cavities of the cavity system of the moving baffle equipped therewith is or are situated on, in particular in, a radially outer shroud of the moving baffle. Additionally or alternatively, in one embodiment, one or several of the impulse bodies of the moving baffle or cavities of the cavity system of the moving baffle equipped therewith is or are situated on, in particular in, one or multiple vane(s) of the moving baffle.

It has been proven, surprisingly, that a particularly advantageous reduction of blade and/or structural vibrations may be effectuated in such an arrangement.

In one embodiment, one or multiple, in particular all, impulse bodies of the guide baffle of the turbomachine stage or of one or several of the turbomachine stages for the or of the turbomachine has or have a mass (in each case) which amounts to at least 1.1 times the mass of the heaviest of the impulse bodies or at most 0.9 times the mass of the most lightweight of the impulse bodies of the moving baffle of these turbomachine stages and/or amounts to at least 0.01 gram (g), in particular at least 0.02 g, and/or at most 0.05 g, in particular at most 0.03 g.

Additionally or alternatively, in one embodiment, one or multiple, in particular all, impulse bodies of the guide baffle of the turbomachine stage or of one or several of the turbomachine stages for the or of the turbomachine has (in each case) a diameter, in particular a minimum or maximum diameter, which amounts to at least 1.1 times a maximum diameter of the largest of the impulse bodies or at most 0.9 times a minimum diameter of the smallest of the impulse bodies of the moving baffle of these turbomachine stages and/or at least 1 mm and/or at most 5 mm, in particular at 20° C.

Additionally or alternatively, in one embodiment, the movement play of one or multiple, in particular all, impulse bodies of the guide baffle and/or of the moving baffle of the turbomachine stage or of one or several of the turbomachine stages for the or of the turbomachine amounts (in each case) to at least 0.01 mm, in particular at least 0.1 mm, and/or at least 1% of a minimum diameter of this impulse body and/or at most 10 mm, in particular, at most 1 mm, and/or at most 100% of a maximum diameter of this impulse body, in particular at 20° C.

It has been proven, surprisingly, that a particularly advantageous reduction of blade and/or structural vibrations may be effectuated with the aid of these parameters or limiting values, even individually in each case, in particular, however, in a combination of two or more of these parameters or limiting values.

BRIEF DESCRIPTION OF THE DRAWINGS

Further advantageous refinements of the present invention result from the subclaims and the following description of preferred embodiments.

FIG. 1 shows, in a partial schematic representation, a meridial section of a turbomachine stage of a turbomachine according to one embodiment of the present invention.

DETAILED DESCRIPTION

FIG. 1 shows one turbomachine stage of a turbomachine according to one embodiment of the present invention in a meridial section along a main machine axis of the turbomachine (horizontally in FIG. 1).

The turbomachine stage includes a guide baffle 10 including multiple guide blades 11 which are situated next to one another in the circumferential direction (relative to the main machine axis).

In this case, guide blades 11 are designed integrally with one another in sets of four and are situated on one shared guide blade carrier 12 which simultaneously forms a part of a radially outer shroud of guide baffle 10 and is attached to a housing 30 of the turbomachine.

Each of these guide blade clusters includes one part of a radially inner shroud 13 of the moving baffle. Of course, this part of radially inner shroud 13 or the two integrally formed parts of the radially inner shroud and the radially outer shroud, in combination, may therefore also be considered to be a guide blade carrier within the scope of the present invention, on which guide blades 11 of the guide blade cluster, which are integral therewith, are situated. Similarly, guide blades 11 may also be integrally bonded, for example, with guide blade carrier 12 or 13.

A housing 110 is attached on the side facing away from the vane (at the bottom in FIG. 1) of each of these guide blade clusters or carriers or parts of radially inner shroud 13 in each case.

In the exemplary embodiment, this housing includes, in each case, six identical or different cavities of a cavity system of the guide baffle, which are closed airtight with the aid of a shared cover 111 and two of which are apparent in the section shown in FIG. 1. These cavities and this cavity system of the guide baffle are indicated uniformly by reference numeral 112.

One impulse body 100 is accommodated in each of cavities 112 with movement play in such a way that the impulse body may collide with the walls of the cavity during operation of the turbomachine.

In a similar way, the turbomachine stage includes a moving baffle 20 including multiple moving blades 21 which are situated next to one another in the circumferential direction (relative to the main machine axis).

In this case, each of the moving blades 21 is situated, with the aid of a blade root 22, on a rotor 40 of the turbomachine, blade root 22 simultaneously including or forming a part of a radially inner shroud of the moving baffle and each of the moving blades 21 including or forming a part of a radially outer shroud 23 of moving baffle 20.

A housing 210 is attached, in a similar way, on the side of each of these parts of radially outer shroud 23 facing away from the vane.

In the exemplary embodiment, this housing includes, in each case, two identical or different cavities of a cavity system of the moving baffle, which are closed airtight with the aid of a shared cover 211 and which are apparent in the section shown in FIG. 1. These cavities and this cavity system of the moving baffle are indicated uniformly by reference numeral 212.

One impulse body 200 is accommodated in each of the cavities 212 with movement play in such a way that the impulse body may collide with the walls of the cavity during operation of the turbomachine.

In one modification, which is not depicted, additionally or alternatively, impulse bodies 200 of moving baffle 20 may be situated or placed in vanes and/or radially inner shroud 22.

The turbomachine stage is designed, in particular configured or manufactured, in such a way that the following applies:

$$\frac{\sum_{i=1}^{n_v} m_i}{s_v - c} \geq 2 \cdot \frac{\sum_{j=1}^{n_b} m_j}{s_b}$$

with masses $m_i$ of total number $n_v$ of impulse bodies 100, masses $m_j$ of total number $n_b$ of impulse bodies 200, total number or number $s_v$ of guide blades 11 of guide baffle 10, total number or number $s_b$ of moving blades 21 of moving baffle 20, and total number or number c of guide blade carriers 12 or 13.

In the exemplary embodiment, all impulse bodies 100 each have a mass of approximately 0.025 g, guide baffle 10 includes, by way of example, 400 guide blades 11 ($s_v$=400) and, therefore, 100 guide blade carriers (c=100), all impulse bodies 200 each have a mass of approximately 0.010 g, and the moving baffle includes, purely by way of example, 200 moving blades 21 ($s_b$=200), so that the following applies:

$$\frac{\sum_{i=1}^{6\cdot100} 0.025\ g}{(400-100)} = 0.05\ g > 2 \cdot 0.02\ g = 2 \cdot \frac{\sum_{i=1}^{2\cdot200} 0.010\ g}{200}$$

Although exemplary embodiments have been described in the description, above, it should be noted that a multitude of modifications is possible. In addition, it should be noted that the exemplary embodiments are merely examples which are in no way intended to limit the scope of protection, the applications, and the design. Instead, those skilled in the art will be provided, via the description, above, with a guideline for implementing at least one exemplary embodiment, whereby various changes, in particular with respect to the function and arrangement of the described components, may be carried out without departing from the scope of protection which results from the claims and combinations of features, which are equivalent thereto.

LIST OF REFERENCE NUMERALS 10 guide baffle
11 guide blade
12 radially outer (guide baffle-/guide blade-)shroud
13 radially inner (guide baffle-/guide blade-)shroud
20 moving baffle
21 moving blade
22 radially inner (moving baffle-/moving blade-)shroud
23 radially outer (moving baffle-/moving blade-)shroud
30 housing
40 rotor
100 impulse body
110 housing
111 cover
112 cavity (system)
200 impulse body
210 housing
211 cover
212 cavity (system)

What is claimed is:

1. A turbomachine stage comprising:
a guide baffle, whose $s_v$ guide blades are situated on c guide blade carriers; and
an adjacent moving baffle including $s_b$ moving blades;
the guide baffle including $n_v$ impulse bodies situated in a cavity system of the guide baffle with movement play with respect to impulse contact;
the moving baffle including $n_b$ impulse bodies situated in a cavity system of the moving baffle with movement play with respect to impulse contact; and quotient $$\frac{\sum_{i=1}^{n_v} m_i}{s_v - c}$$

of sum $$\sum_{i=1}^{n_v} m_i$$

of the masses of all impulse bodies of the guide baffle divided by difference ($s_v$–c) of number $s_v$ of all guide blades minus number c of all guide blade carriers amounting to at least 1.5 times quotient $$\frac{\sum_{j=1}^{n_b} m_j}{s_b}$$

of sum $$\sum_{j=1}^{n_b} m_j$$

of the masses of all impulse bodies of the moving baffle divided by number $s_b$ of all moving blades $$\left( \frac{\sum_{i=1}^{n_v} m_i}{s_v - c} \geq 1.5 \cdot \frac{\sum_{j=1}^{n_b} m_j}{s_b} \right).$$

2. The turbomachine stage as recited in claim 1 wherein the moving baffle is situated upstream or downstream from the guide baffle.

3. The turbomachine stage as recited in claim 1 wherein the turbomachine stage is a compressor or turbine stage.

4. The turbomachine stage as recited in claim 3 wherein the turbomachine stage is a gas turbine turbomachine stage.

5. The turbomachine stage as recited in claim 1 wherein at least two of the guide blades are situated on at least one of the guide blade carriers.

6. The turbomachine stage as recited in claim 5 wherein the at least two of the guide blades are situated on the guide blade carrier nondestructively removably.

7. The turbomachine stage as recited in claim 5 wherein the at least two of the guide blades are situated non-nondestructively removably attached to the guide blade carrier or designed integrally with the guide blade carrier.

8. The turbomachine stage as recited in claim 1 wherein at least one of the impulse bodies of the guide baffle or at least one of the impulse bodies of the moving baffle is spherical.

9. The turbomachine stage as recited in claim 1 wherein exactly one or at least two of the impulse bodies of the guide baffle is or are situated in at least one cavity of the cavity system of the guide baffle or exactly one or at least two of the impulse bodies of the moving baffle is or are situated in at least one cavity of the cavity system of the moving baffle.

10. The turbomachine stage as recited in claim 1 wherein at least one of the impulse bodies of the guide baffle or at least one of the impulse bodies of the moving baffle is non-captively situated in a cavity of the cavity system.

11. The turbomachine stage as recited in claim 1 wherein at least one cavity of the cavity system of the guide baffle or at least one cavity of the cavity system of the moving baffle is situated in a separately manufactured housing.

12. The turbomachine stage as recited in claim 1 wherein the cavity of the cavity system of the guide baffle or the cavity of the cavity system of the moving baffle is airtight.

13. The turbomachine stage as recited in claim 1 wherein at least one of the impulse bodies of the guide baffle is situated on a radially inner shroud, at least one of the impulse bodies of the guide baffle is situated on a vane of the guide blade, or at least one of the impulse bodies of the guide baffle is situated on a radially outer shroud of the guide baffle, or at least one of the impulse bodies of the moving baffle is situated on a radially inner shroud of the moving baffle, at least one of the impulse bodies of the moving baffle is situated on a vane of the moving blades, or at least one of the impulse bodies of the moving baffle is situated on a radially outer shroud of the moving baffle.

14. The turbomachine stage as recited in claim 13 wherein the at least one of the impulse bodies of the guide baffle is situated in the radially inner shroud, or in the vane of the guide blade, or in the radially outer shroud of the guide baffle, or the at least one of the impulse bodies of the moving baffle is situated in the vane of the moving blades or in the radially outer shroud of the moving baffle or in the radially inner shroud of the moving baffle.

15. The turbomachine stage as recited claim 1 wherein at least one of the impulse bodies of the guide baffle has a mass which amounts to at least 1.1 times the mass of the heaviest or at most 0.9 times the mass of the most lightweight of the impulse bodies of the moving baffle or amounts to at least 0.01 g and/or at most 0.05 g.

16. The turbomachine stage as recited in claim 1 wherein at least one of the impulse bodies of the guide baffle has a diameter amounting to at least 1.1 times a maximum diameter of the largest or at most 0.9 times a minimum diameter of the smallest of the impulse bodies of the moving baffle or amounts to at least 1 mm or at most 5 mm.

17. The turbomachine stage as recited in claim 16 wherein the diameter is diameter is a minimum or maximum diameter.

18. The turbomachine stage as recited in claim 1 wherein the movement play of at least one of the impulse bodies of the guide baffle or the movement play of at least one of the impulse bodies of the moving baffle amounts to at least 0.01 mm or at least 1% of a minimum diameter of the impulse body or at most 10 mm or at most 100% of a maximum diameter of the impulse body.

19. A turbomachine comprising the turbomachine stage as recited in claim 1.

20. A gas turbine comprising the turbomachine as recited in claim 19.

21. An aircraft engine gas turbine comprising the gas turbine as recited in claim 20.

22. A method for configuring or manufacturing a turbomachine stage as recited claim 1 comprising equipping the guide baffle with the impulse bodies and equipping the moving baffle with the $n_b$ impulse bodies in such a way that quotient $$\frac{\sum_{i=1}^{n_v} m_i}{s_v - c}$$

of sum $$\sum_{i=1}^{n_v} m_i$$

of the masses of all impulse bodies of the guide baffle divided by the difference $(s_v - c)$ of the number $s_v$ of all guide blades minus the number $c$ of all guide blade carrier amounts to at least 1.5 times quotient $$\frac{\sum_{j=1}^{n_b} m_j}{s_b}$$

of sum $$\sum_{j=1}^{n_b} m_j$$

of the masses of all impulse bodies of the moving baffle divided by the number $s_b$ of all moving blades $$\left( \frac{\sum_{i=1}^{n_v} m_i}{s_v - c} \geq 1.5 \cdot \frac{\sum_{j=1}^{n_b} m_j}{s_b} \right).$$

23. The turbomachine stage as recited in claim 1 wherein the guide baffle has at least two cavities, each of the cavities of the guide baffle including one of the $n_v$ impulse bodies.

24. The turbomachine stage as recited in claim 23 wherein the two cavities are closed by a shared cover.

25. The turbomachine stage as recited in claim 1 wherein the moving baffle has at least two cavities, each of the cavities of the moving baffle including one of the $n_b$ impulse bodies.

26. The turbomachine stage as recited in claim 23 wherein the two cavities are closed by a shared cover.

* * * * *